United States Patent [19]

Plude

[11] Patent Number: 5,228,541
[45] Date of Patent: Jul. 20, 1993

[54] AIRCRAFT BRAKE WEAR LIMIT INDICATOR HAVING INTEGRAL CONFIGURATION CONTROL AND METHOD

[75] Inventor: Leo W. Plude, Woodinville, Wash.

[73] Assignee: The Boeing Company, Seattle, Wash.

[21] Appl. No.: 809,775

[22] Filed: Dec. 18, 1991

[51] Int. Cl.⁵ .................... F16D 66/02; G01D 21/00
[52] U.S. Cl. ................................ 188/1.110; 116/208
[58] Field of Search .................... 188/1.11, 71.5; 116/208, 216; 192/30 W

[56] References Cited

U.S. PATENT DOCUMENTS

| | | | |
|---|---|---|---|
| 4,013,143 | 3/1977 | Juhasz | 188/1.11 |
| 4,279,214 | 7/1981 | Thorn | 188/1.11 |
| 4,658,936 | 4/1987 | Moseley | 188/1.11 |
| 4,989,537 | 2/1991 | Hutchinson, Sr. et al. | 188/1.11 |

Primary Examiner—Robert J. Oberleitner
Assistant Examiner—Chris Schwartz
Attorney, Agent, or Firm—Conrad O. Gardner; B. A. Donahue

[57] ABSTRACT

A brake wear limit indicator which is matched to the brake energy capacity of the overhauled brake. A wear limit bushing is attached to the brake piston housing. The bushing length is chosen based on the brake energy capacity of the brake and is marked with a related part number. A wear pin is attached to the brake pressure plate and extends through a hole in the bushing. Brake overhaul is required when the brake wears such that the pin no longer protrudes from the bushing.

1 Claim, 3 Drawing Sheets

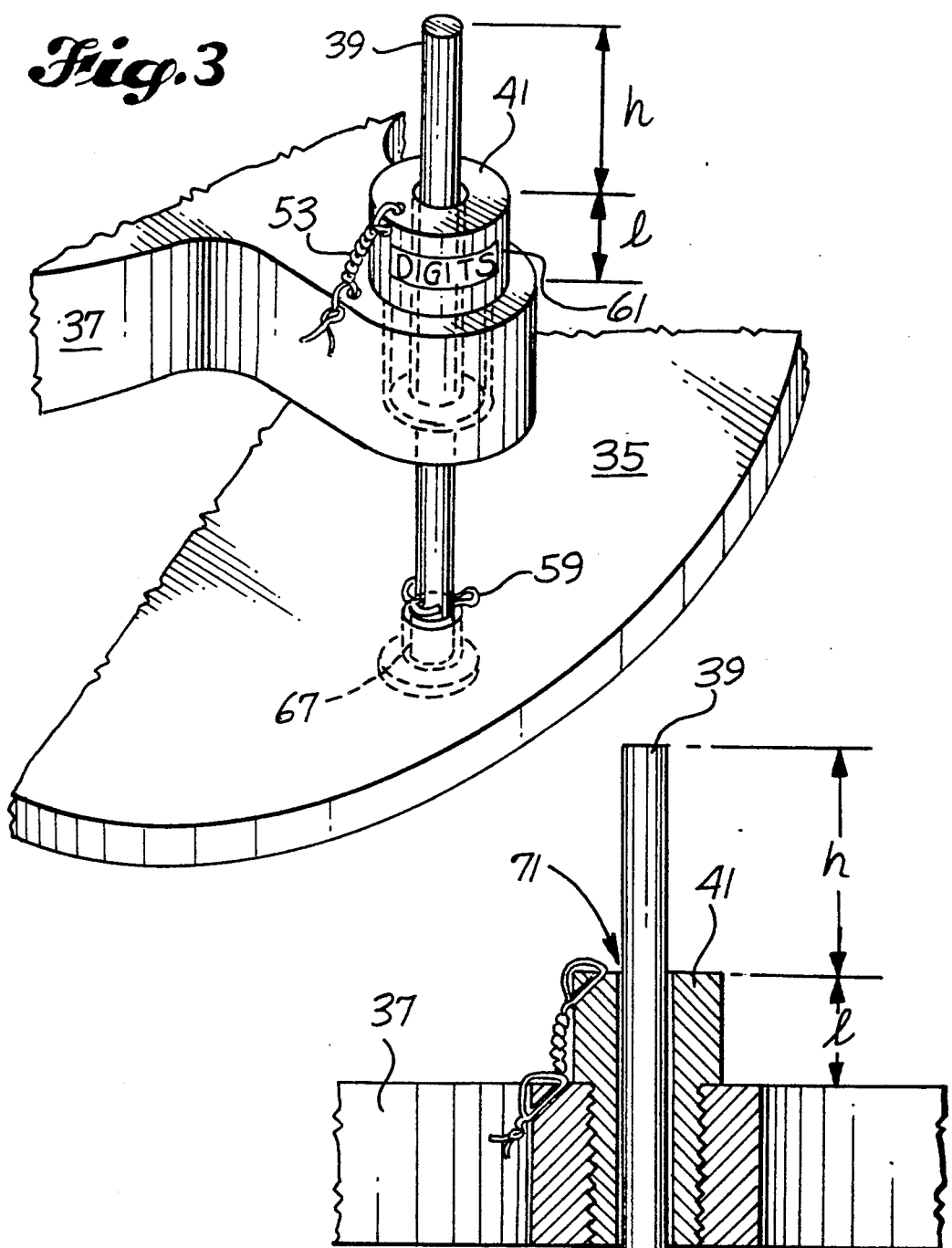

AIRCRAFT BRAKE WEAR LIMIT INDICATOR HAVING INTEGRAL CONFIGURATION CONTROL AND METHOD

BACKGROUND OF THE INVENTION

This invention relates to aircraft brake wear limit indicators and, more particularly, to brake wear limit indicators incorporating a means to provide configuration control of the brake.

DESCRIPTION OF PRIOR ART

In the past, commercial jet aircraft brake stopping performance and brake energy capacity was based on testing conducted on new brakes. Currently, however, the Federal Aviation Administration (FAA) is requiring worn brake accountability on all commercial jet transport category aircraft because there is a degradation in stopping performance and brake energy capacity when steel brakes are worn. As a result of this recent FAA activity relative to worn brake stopping performance, many steel brakes require wear limit adjustments and re-identification of the brake configuration.

It has been standard practice in the past to provide brake part number identification by using raised lettering and/or stamping of the brake piston housing. Wear pins have also been used to indicate when a brake has been fully worn (indicated by a flush wear pin), and should be removed from the aircraft for overhaul. The brake piston housing is a pressure vessel and is under considerable stress during operation. Re-identification by stamping or the attachment of fasteners for the installation of a nameplate introduces undesired stress risers in the brake piston housing. Therefore, it has been past practice to refrain from re-identification when wear limits are changed.

Part number control is required by the FAA approved Airplane Flight Manual. Because of the concerns associated with re-identification, steel brakes certified for a higher brake energy capacity could not be used at lower brake energy performance values or vice versa.

Indication of brake wear with wear pins referenced to movable brake components are known in the prior art patent literature; as exemplified, e.g., by U.S. Pat. No. 4,658,936 issued Apr. 21, 1987 to Moseley, which contains a wear pin which is held against the pressure plate with spring tension, and wherein the pin is marked to indicate the amount of brake wear by the amount of protrusion from the housing.

BRIEF SUMMARY OF THE INVENTION

An aircraft brake wear limit indicator having integral configuration control in which wear limit bushings with varying dimensions wherein the different dimensions are used correspond to discrete predetermined brake energy capacities for the aircraft brake. Indicia embossed or stamped in the wear limit bushing contains brake part number indicia. Such indicia correspond to the predetermined energy capacity of the aircraft brake. As the aircraft brakes are worn, a new wear limit indicator with different length dimension may be installed by simple lockwire removal. Such replacement permits the use of brakes with energy capacities other than those of the original new brake configuration. The present invention further avoids the need for disassembly of the brake to change the wear pin or re-identification of the brake piston housing.

It is accordingly an object of the present invention to provide a brake wear limit indicator with an integral brake part number configuration control, thus allowing more freedom in the aircraft brake usage.

BRIEF DESCRIPTION OF THE DRAWINGS

The following is a brief description of the drawings in which like parts bear like reference numerals and in which:

FIG. 4 is a sectional view of the perspective view in FIG. 3 of the present wear limit indicator.

EMBODIMENT OF THE INVENTION

Figure 1:
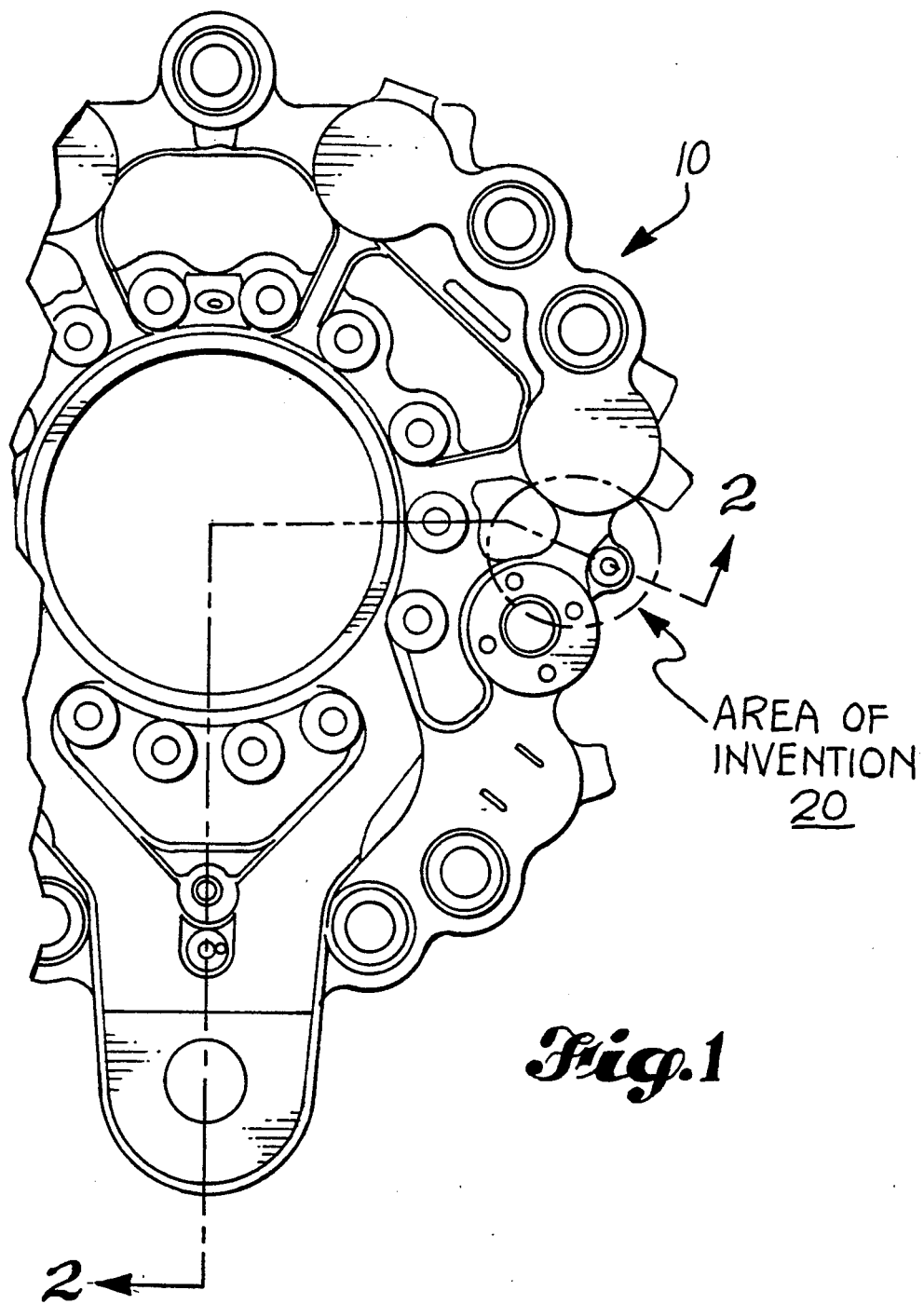
FIG. 1 is a fragmentary sectional view of an aircraft brake assembly embodying the invention showing the location of a preferred embodiment of the present invention.
Figure 2:
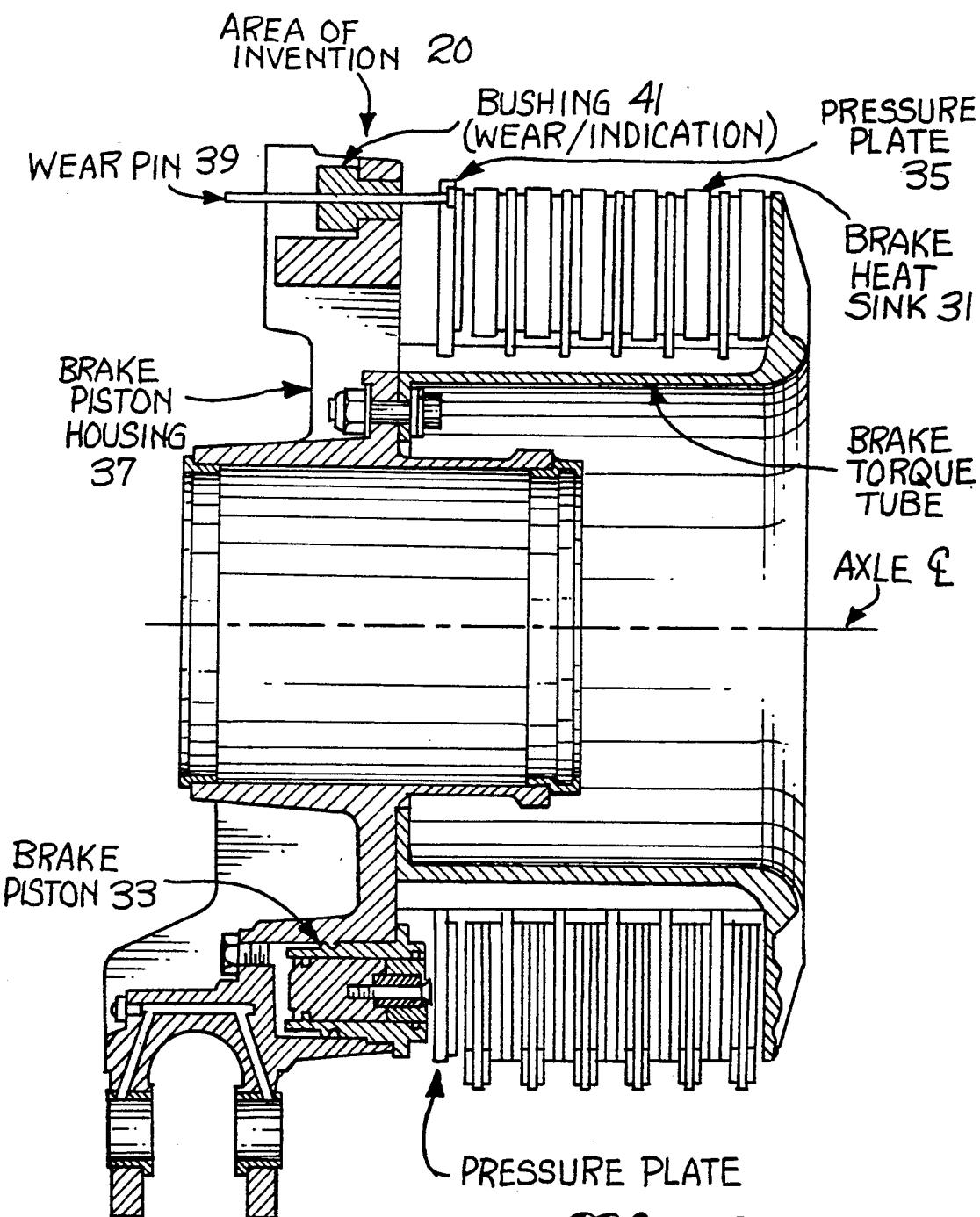
FIG. 2 is a sectional view taken along the lines 2—2 of the aircraft brake assembly of FIG. 1; and, FIG. 3 is a perspective view illustrating in detail a preferred embodiment of the present aircraft brake wear limit indicator having integral configuration control.

Referring now to FIG. 1, there is illustrated an aircraft brake assembly 10, wherein a section is taken along the lines 2—2 to show in FIG. 2 the present aircraft brake wear limit indicator in cooperative relationship with the surrounding brake assembly structure. A full understanding of how the present brake wear limit indicator operates is described hereinafter in detail with reference to FIG. 3, wherein corresponding reference numerals are included in FIG. 2 with functional description only in FIG. 2 used for simple identification of surrounding brake assembly structure. From FIG. 2 it can be seen that as the brake heat sink 31 wears, the brake piston 33 pushes the pressure plate 35 away from piston housing 37, thereby pulling wear pin 39 through wear limit bushing 41.

Turning now to FIG. 3, it can be seen that wear limit bushing 41 is threaded into aircraft brake piston housing 37 and restrained from becoming dislodged by lockwire 53, which is coupled between wear limit bushing 41 and aircraft brake piston housing 37. Wear limit bushing 41, which is cylindrically shaped, is manufactured with a longitudinal dimension (1) which corresponds to a predetermined brake energy capacity desired for the aircraft brake. An indicia region 61 containing embossed or stamped digital information identifying the brake part number corresponding to the predetermined brake energy capacity desired for the aircraft brake is provided on an outer surface portion of wear limit bushing 41.

Inserted in a hole 67 in brake pressure plate 35 (as seen in FIG. 4) is wear pin 39. Wear pin 39 is attached to brake pressure plate 35 by cotter pin 59. At the time brake heat sink 31 (seen in FIG. 2) is overhauled, protruding wear pin dimension length or effective height (h) (as seen in FIGS. 3 and 4) is set for a selected predetermined brake energy capacity corresponding to digital information in indicia region 61, which identifies the aforementioned brake part number.

As the brake components wear during service usage, brake pressure plate 35 moves away from brake piston housing 37. This movement, in turn, pulls wear pin 39 through hole 71 in wear limit bushing 41. When wear pin 39 dimension along its length (h) becomes zero (it no longer protrudes, but the end, thereof, is flush with the end surface of wear limit bushing 41), the brake is removed from the aircraft for overhaul.

Should a brake on the aircraft or in spares inventory need to be modified for a particular energy capacity other than the initial configuration, all that is needed is to remove lockwire 53 and wear limit bushing 41 and then install wear limit bushing 41 corresponding to the desired energy capacity and lockwire 53. By installation of the new wear limit bushing 41, the wear pin dimension (h) is raised or lowered and brake part number 61 changed automatically to correspond to the desired brake energy capacity. No disassembly of the brake to change the wear pin 39 or re-identification of the brake piston housing 37, which can cause stress risers, is needed. This has the advantage of reducing brake spares inventory. It also has the advantage of providing a means for the FAA inspector to verify if the brake is correct configuration for the desired brake energy and stopping performance.

What is claimed is:

1. A method of modifying a brake on an aircraft to accommodate a change in brake energy capacity comprising the steps of:

removing a lockwire and a first wear limit bushing, said wear limit bushing comprising an indicia region with indicia therein to correspond to a first predetermined energy capacity; and then installing a second wear limit bushing with an axial length corresponding to a second desired predetermined energy capacity thereby changing the effective height (h) of a wear pin, said second wear limit bushing comprising an indicia region with indicia therein to correspond to said second desired predetermined energy capacity; and installing said lockwire.

* * * * *